FORMATION OF TAPERED EDGES ON MAGNETIC FILMS BY PHOTOLYTIC ETCHING
Filed March 4, 1968
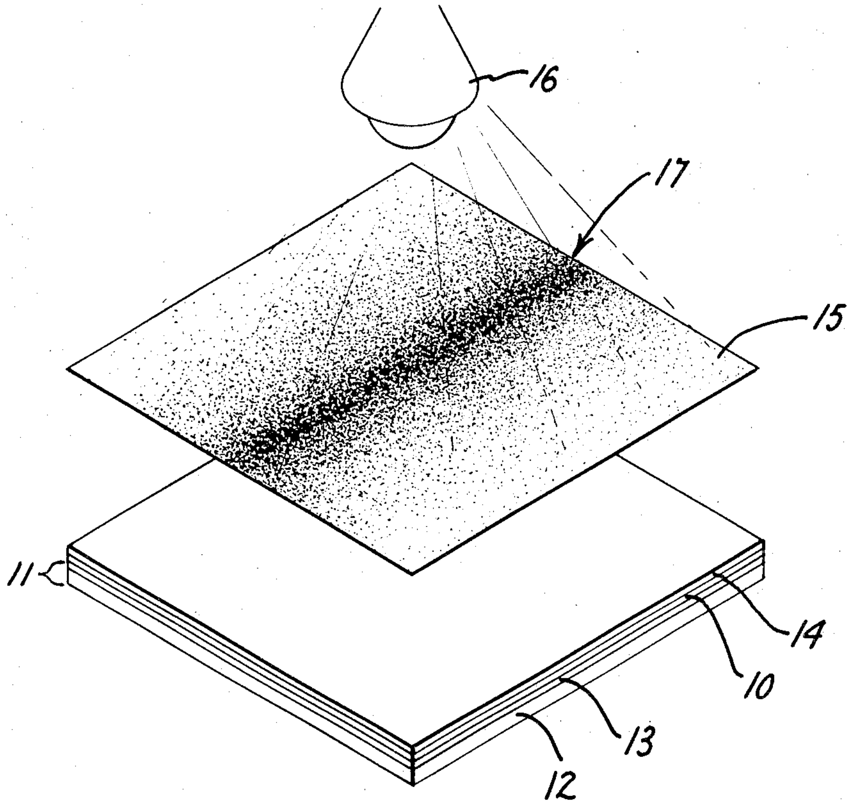
Inventor:
James F. Burgess,
by Richard R. Brainard
His Attorney.

United States Patent Office 3,551,227

Patented Dec. 29, 1970

3,551,227

FORMATION OF TAPERED EDGES ON MAGNETIC FILMS BY PHOTOLYTIC ETCHING

James F. Burgess, Schenectady, N.Y., assignor to General Electric Company, a corporation of New York Filed Mar. 4, 1968, Ser. No. 709,962
Int. Cl. C23f *1/02*
U.S. Cl. 156—13 9 Claims

ABSTRACT OF THE DISCLOSURE

Smooth, tapered edges inhibiting undesirable flux concentrations in magnetic films of nickel-iron, and their alloys are formed by coating the magnetic film with a vehicle containing a photodecomposable compound and exposing the vehicle with activating radiation exhibiting a smoothly tapering power distribution at the edges of the magnetic film. Upon decomposition of the compound, a chemical species is formed point by point at the magnetic film surface in a quantity directly proportional to the power distribution of the irradiating source and the species reacts with the magnetic material to form a soluble product thereby producing a smoothly tapered etching of the magnetic film edges. The speed of reaction with the magnetic film, and therefore the degree of etching, also can be selectively controlled by application of solvent vapor to the coated magnetic film either before or after irradiation of photodecomposable compound.

This invention relates to the formation of tapered edges on magnetic films to inhibit subsequent undesirable flux concentrations in the films, and more particularly, to the photolytic etching of magnetic films of nickel-iron and alloys thereof utilizing activating radiation having a tapering power distribution at the magnetic film edges.

In the formation of magnetic films for high speed computers, a vacuum evaporated magnetic material, such as nickel-iron or nickel-iron-cobalt, is deposited through a mask atop a substrate heated to a temperature in excess of 250° C. and positioned within a magnetic field oriented to produce uniaxial anisotropy in the deposited film. Because the switching characteristics of the magnetic film can be adversely effected by sharply sloping edges in the magnetic film wherein flux lines tend to congregate, various methods, e.g. the multiple etching of a deposited film using photoresist techniques to form a stepped edge, heretofore have been employed to obtain a tapered configuration at the edges of the magnetic film. These prior methods generally produce a magnetic film having a plurality of successive distinct steps greater than at least 50 A. and offer edges of sufficient dimension to permit a significant congregation of flux therein.

The use of photodecomposable materials to selectively etch various metallic films for diverse purposes is known and is exemplified by the method disclosed and claimed in U.S. Pat. No. 3,346,384, issued on Oct. 10, 1967, and assigned to the assignee of the present invention. In the aforementioned patent, various metals such as silver, tin, copper, etc., are etched utilizing a polyhalogenated organic compound which liberates photolytic halogen when exposed to activating radiation with a minimum thickness control of 15 A. being achievable in the formation of a gray scale upon a copper film. Similarly, the etching of nickel-chromium resistors utilizing reactants such as N,N'-dibromodimethylhydantoin have been described and claimed in copending application Ser. No. 604,602, filed Dec. 27, 1966 in the names of Donald L. Schaefer and James F. Burgess, and assigned to the assignee of the present invention. However, the utilization of the photometallic etching process to form tapered edges on magnetic films of relatively highly reactive metals, such as nickel-iron, to inhibit flux concentration at the edges thereof generally has not been known.

It is therefore an object of this invention to provide a novel method of forming tapered edges on magnetic films of nickel-iron and alloys thereof to inhibit the congregation of flux therein.

It is a further object of this invention to provide a method of selectively varying the thickness of magnetic films in steps of less than 50 A.

These and other objects of this invention generally are achieved by coating a magnetic film having uniaxial anisotropy and selected from the group consisting of nickel-iron and alloys thereof with a vehicle containing a compound which is photodecomposable to form a chemical species reactive with the magnetic material to form a soluble product. The vehicle then is exposed to activating radiation exhibiting a tapering power distribution along the length of the magnetic film to form the reactive species in a quantity proportional to the radiation power distribution. Upon formation, the species reacts with the magnetic film in direct proportion to the quantity of species produced and the film is etched in a gradually tapering manner.

The various features of the present invention may be more completely understood by considering the following detailed description in conjunction with the attached drawing in which:

The figure represents a preferred method of producing the tapered edge.

Referring to the attached figure, a magnetic film 19 of nickel-iron or alloys thereof, e.g. nickel-iron-cobalt, is selectively etched utilizing photolytic etching to produce a film edge tapering in steps of less than 50 A. To assure high purity in the film, as required for subsequent high quality recording, the film is deposited in a vacuum environment upon a suitable substrate 11, such as a polyamide coated copper ground plane 12, heated to a temperature between 250 to 400° C., and a magnetic field is applied during the deposition to obtain uniaxial anisotropy in the deposited magnetic film. While no minimum thickness for the magnetic film is imposed by this invention, continuity in the deposited film and desired magnetic characteristics generally will require the film be greater than 50 A. in thickness. When the thickness of the film exceeds 1000 A., the obtainable resolution achievable with the photolytic etching process of this invention is adversely affected thereby impairing the uniformity of the tapered edge and the repetitive switching characteristics of the film. However, if the tolerances in the commercial product utilizing the magnetic film permit, film thicknesses up to 2000 A. can be etched employing film coatings of relatively thick polymer layers containing large quantities of photodecomposable etchant.

The polyamide film 13 situated between deposited magnetic film 18 and ground plane 12 functions primarily to electrically insulate ground plane 12 from magnetic film 10 and to smooth the ground plane surface to assure uniform magnetic film deposition. The polyamide film also can serve as a barrier layer to shield the ground plane during the photolytic etching of the magnetic film when the halide formed by the photodecomposable material is reactant with the ground plane material. One of the most suitable polyamide films for utilization in magnetic film depositions because of the relative stability of the polyamide at temperatures in excess of 200° C. is H Film sold by the Du Pont Company.

To taper the edge of magnetic film 10 in a plurality of incremental steps of less than approximately 50 A. thereby approximating a continuously sloping curve, a halogenated compound capable of liberating a photolytic halogen upon activating radiation is mixed in a suitable vehicle, e.g. polymer solution having the ability to be cast, and the mixture is coated upon the magnetic film. The halogenated compound preferably is an iodine compound because of the relative stability displayed by such compounds, with materials such as iodobenzene, iodoacetic acid, hydroxylated polymeric resin modified by iodine substitution, tetraiodopyrrole, methyl iodide, methylene iodide, potassium iodide, and N-iodosuccinimide, being suitable as photodecomposable materials for thin magnetic films of nickel-iron and alloys thereof. Bromide and chloride organic compounds also can be used as the photodecomposable compound dependent upon the degree of reactivity of the specific compound with the film to be etched. For example, N,N'-dibromodimethylhydantoin dissolved in a 10 percent polystyrene solution immediately reacts with a magnetic film of 78 percent nickel, 18 percent iron and 4 percent cobalt when coated upon the magnetic film and therefore is not suitable for utilization in accordance with this invention while carbon tetrabromide dissolved in a 10 percent polystyrene solution etched the nickel-iron-cobalt film only upon photodecomposition of the halogenated organic compound. Either organic compounds, or inorganic compounds, can be suitably used as the reactive halogenated compound of this invention.

The halogenated compound is mixed with a suitable carrier, e.g. a polymer solution characterized by a high solubility for the halogenated compound and a relative stability when coated upon the film to be etched. If the polymer is not compatible with the halogenated compound chosen to effect the photolytic etching, the halide compound tends to separate from the polymer solution as solid particles upon partial evaporation of the polymer solvent and light beams impinging upon the polymer are scattered by the separated particles to partially destroy the resolution of the system. The vehicle for carrying the halogenated compound may be in a liquid or a solid state and may consist of alcohol or water for inorganic compounds with polymers such as polystyrene, acrylic resin, hydroxylated polymeric resins, polyvinylpyrrolidone, polyvinylchloride, polysulfone, alcohol soluble butyrates and copolymers of methyl vinyl ether and maleic anhydride being suitable carriers for organic halogenated compounds. Generally the carrier is saturated with the halogenated compound to minimize the required thickness of the halogenated compound containing coating for etching a film of a given thickness. To completely etch through the magnetic film at selected areas, the halogenated containing compound should be of a thickness approximately at least 100 times greater than the thickness of the magnetic film being etched. For example a 20 micron thick layer containing 0.2 gram of iodoform dissolved in 5 cc. of 10 percent polystyrene solution diluted with a mixed benzene, toluene and xylene solvent generally is sufficient for the formation of tapered edges on a 400 A. nickel-iron-cobalt magnetic film.

When the vehicle for carrying the photodecomposable halogenated compound has a density or phase such that the vehicle cannot be adequately applied to the magnetic film by conventional methods such as dipping, spraying, or brushing, the vehicle can be diluted or dissolved with solvents suitable for the composition of the vehicle. Thus for organic vehicles, an organic solvent such as tetrahydrofuran or benzene can be employed to dilute or dissolve the vehicle. Preferably the solvent consists of a plurality of ingredients, e.g. a 50 percent benzene, a 30 percent toluene and a 20 percent xylene solution, to produce uniform casting when mixed with a suitable organic vehicle. The differing evaporation temperatures of the various solvents inhibits the formation of a haze upon the organic vehicle as the vehicle is tackified either by ambient air drying or oven drying when dry etching is desired. The photodecomposable material must be sufficiently compatible with the vehicle to remain dissolved (or in suspension) upon a tackifying of the vehicle to assure the etching resolution required for magnetic film edge tapering.

The vehicle containing the photodecomposable compound in solution (or suspension) is applied to the magnetic film by any of the conventional methods to form an overlayer 14 having a thickness approximately at least 100 fold greater than the thickness of magnetic film 10 thereby assuring sufficient subsequent generation of reactive agents to completely etch the magnetic film. The required thickness of the photodecomposable compound containing overlayer generally is dependent upon such factors as the concentration of the photodecomposable compound within the overlayer as well as the thickness and composition of the magnetic film to be etched. After application of overlayer 14 to magnetic film 10, a photomask 15 having a transparency which tapers in accordance with the desired tapering for the magnetic film is placed between the coated magnetic film and a light source 16 which irradiates overlayer 14 for a suitable periol to effect a point by point photodecomposition of the halogenated compounds in direct proportion to the light intensity striking overlayer 14. Upon photodecomposition of the halogenated compound, photolytic halogen is released and reacts with magnetic film 10 to produce a tapered edge having incremental steps corresponding to the point by point illumination of the overlayer through photomask 15. Preferably, photolytic halogen is released in quantities (dependent upon factors such as halogenated compound concentration and light intensity) to etch completely through the magnetic film at points underlying areas of maximum light transmission through the photomask. As the light transmission to the magnetic film is diminished by gray areas 17 of photomask 15, the quantity of reactive halide produced by photodecomposition is diminished and ferred to obtain the desired taper at the edges of the magnetic film, an incrementally tapering edge also can be formed by a variation in the scan rate and/or intensity the etching of film 10 is decreased in direct proportion to the intensity of the light point by point decomposing the halogenated compound contained in overlayer 14. Although a light filter, e.g. photomask 15, generally is preof a light beam across the overlayer.

Because the quantity of solvent in the vehicle containing the photodecomposable compound tends to vary the speed of reaction of the released halide with the underlying magnetic film to be etched, the degree of etching of either can be regulated by a control of the quantity of solvent the entire magnetic film or selected portions of the film cation between vehicles of differing solvent concentrations, in the vehicle overcoating the film. Sharp lines of demarhowever, generally are very difficult to obtain and the tion generally is poor. The use of solvent vapors, e.g. such as methanol vapors for an organic vehicle, over the resolution produced by a control in the solvent concentraentire surface of the vehicle forming the magnetic film overcoating (either before or after application of the irdimension. A preferred method of applying the vapors to radiating rays) can assist in speeding the reaction time required to etch through a magnetic film of the desired the coated film is to saturate an absorbant material with liquid methanol and position (either before or after irradiation of the overcoating) the vehicle coated magnetic film upon the material in an ambient temperature of about 25° C. Other suitable methods of controlling the solvent content in the vehicle forming the film overcoating, e.g. spraying the solvent atop the overcoating or varying the quantity of solvent in liquid vehicles, also can be employed to control the speed and/or degree of etching.

After a period of time has elapsed sufficient to etch the magnetic film to a desired thickness, the vehicle forming the overcoating and the soluble products formed by the reaction of the liberated photolytic halogen with the magnetic film can be removed from the film using a suitable solvent. Preferably the solvent should be of a dual nature, e.g. to arrest the reaction between the liberated photolytic halogen and the magnetic film and to remove the soluble overcoating and soluble products from the magnetic film. Because this is not easily obtainable in a single solvent, a two step removal process preferably is employed to clean the etched film. For example, a polystyrene solution containing iodoform can be arrested using acetone with a benzene solution subsequently being employed to remove the coating from the magnetic film.

For commercial magnetic memory devices, a 4" by 4" magnetic film having uniaxial anisotropy may be etched by a suitable multi-perforated mask into a plurality of bits, each bit being dimensioned to the minimum area required for the recording density employed, e.g. being of a surface area in the order of square mils or less for most commercial magnetic memory devices, and having tapered edges to inhibit the concentration of flux in the individual bits. Conductors forming a word line and a common bit sense line then are disposed in electromagnetic coupling relationship with each bit to record and read out information from the memory device.

The specific utilization of the teaching of this invention with various magnetic films and etchants is illustrated in the following examples.

EXAMPLE 1

A 400 A. 78% nickel, 18% iron, and 4% cobalt magnetic film deposited atop a polyamide coated copper sheet was brush coated with a 20 micron thick polymer layer formed by the dissolution of 0.2 gram iodoform in 5 cc. of a 10% by weight solution of a polystyrene resin (sold under the trade name PS666 by the Dow Chemical Corporation) with suitable quantities of a 50% benzene, 30% toluene, and 20% xylene solvent. The multiple component solvent served to enhance the ease of coating the film and to produce uniform casting of the solution when subsequently air dried at room temperature. A photomask then was positioned between a 500 watt projector lamp and the coated magnetic film and the film was exposed for 5 minutes through the photomask. Upon completion of the irradiation of the magnetic film coating, the coated film was placed atop a towel seeped with methanol vapor for 2 minutes whereupon the polymer layer was removed with a solvent rinse of acetone and benzene. The image of the photomask was etched in the metal layer with the degree of etching being proportional point by point to the transmissivity of the photomask. At those areas where the mask was of a gray scale, e.g. partially transparent, a partial etching of the film was obtained. At those places where there was a transition from transparent to black with an intermediate gray scale, the film exhibited a tapering in the degree of etching proportional to the transmissivity of the photomask.

EXAMPLE 2

This example was conducted in a manner identical to that of Example 1 except for the fact that irradiation of the coated film was accomplished in 2½ minutes. The degree of edge taper of the magnetic film was approximately identical to the edge taper exhibited by the magnetic film etched for 5 minutes in Example 1.

EXAMPLE 3

0.3 gram of N-chlorosuccinimide was dissolved in 5 cc. of a 10% by weight solution of an alcohol soluble butyrate (sold under the trade name ASB by American Cyanamid Company) diluted with a methanol solvent and the dilute mixture was coated upon a 400 A. thick 78% nickel, 18% iron, and 4% cobalt magnetic film to form a 20 micron thick overcoating on the magnetic film. After a 30 minute selective irradiation of the coated film through a photomask having a tapering transmissivity utilizing a projector with a 400 W. lamp, methanol vapors were passed over the coated film for approximately 2 minutes. The polymer layer then was removed utilizing successive rinses in acetone and benzene. The film exhibited a selective etching corresponding point by point to the transmissivity variations in the photomask.

What I claim as new and desire to secure by Letters Patent of the United States is:

1. A method of forming tapered edges on thin film magnetic materials having uniaxial anisotropy and selected from the group consisting of nickel-iron and alloys thereof, whereby undesirable flux concentrations are inhibited, comprising coating said magnetic material with a vehicle containing a compound which is photodecomposable to form a chemical species reactive with said magnetic material to form a soluble product, exposing said vehicle to a source of activating radiation that is variable in intensity, varying the intensity of said activating radiation to produce a tapering power distribution along the length of said magnetic film to form said reactive species in a quantity varying proportional to said radiation power distribution and reacting said formed species with said magnetic film to produce soluble products.

2. A method of forming tapered edges on thin film magnetic materials according to claim 1 further including the application of a solvent to said vehicle to control the speed of reaction.

3. A method of forming tapered edges on thin film magnetic materials according to claim 1 wherein said photodecomposable compound contains a halide selected from the group consisting of iodide, chloride, and bromide.

4. A method of forming tapered edges on thin film magnetic materials according to claim 1 wherein said magnetic film has nickel and iron concentrations in the ratio of between 4 and 6 to 1, said magnetic film having less than 10 percent other constituents.

5. A method of forming tapered edges on thin film magnetic materials according to claim 1 wherein said film is a nickel-iron-cobalt alloy.

6. A method of forming tapered edges on thin film magnetic materials according to claim 5 wherein said photodecomposable compound is iodoform.

7. A method as set forth in claim 1, wherein said varying step comprises: inserting between said source and said vehicle a mask of tapering density distribution aligned with the length of said magnetic film.

8. A method as set forth in claim 1, wherein said varying step comprises the steps of: scanning a beam of radiation across said vehicle in a plurality of scans along the length of said magnetic film, and varying the rate of scanning during each scan of said beam across said vehicle.

9. A method as set forth in claim 1, wherein said varying step comprises the steps of: scanning a beam of radiation across said vehicle in a plurality of scans along the length of said magnetic film, and varying the intensity of said beam of radiation during each scan of said beam across said vehicle.

References Cited

UNITED STATES PATENTS 3,346,384 10/1967 Gaynor ---------------- 96—36

JACOB H. STEINBERG, Primary Examiner

U.S. Cl. X.R.

96—36